(12) United States Patent
Rosenberg

(10) Patent No.: US 10,630,843 B1
(45) Date of Patent: Apr. 21, 2020

(54) DIALING INTO A MEETING WITHOUT ENTERING INFORMATION

(71) Applicant: Cisco Technology, Inc., San Jose, CA (US)

(72) Inventor: Jonathan Rosenberg, Freehold, NJ (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/281,809

(22) Filed: Feb. 21, 2019

(51) Int. Cl.
*H04M 3/56* (2006.01)
*H04M 3/42* (2006.01)
*G06Q 10/10* (2012.01)
*H04L 29/06* (2006.01)

(52) U.S. Cl.
CPC ........ *H04M 3/565* (2013.01); *G06Q 10/1095* (2013.01); *H04L 63/0428* (2013.01); *H04L 65/1006* (2013.01); *H04L 65/1069* (2013.01); *H04L 65/1093* (2013.01); *H04L 65/403* (2013.01); *H04M 3/42059* (2013.01); *H04M 3/567* (2013.01)

(58) Field of Classification Search
None
See application file for complete search history.

(56) References Cited

U.S. PATENT DOCUMENTS

| | | | |
|---|---|---|---|
| 7,353,251 B1 | 4/2008 | Balakrishnan | |
| 8,107,402 B1 | 1/2012 | Everson et al. | |
| 8,914,734 B2 | 12/2014 | Narayanaswamy | |
| 9,094,522 B2 | 7/2015 | Bhow | |
| 9,591,140 B1* | 3/2017 | Carlson | H04M 3/56 |
| 2011/0154204 A1* | 6/2011 | Narayanaswamy | H04M 3/56 715/727 |
| 2014/0177815 A1* | 6/2014 | Bhow | H04L 12/1818 379/202.01 |
| 2016/0021254 A1* | 1/2016 | Red | H04M 3/565 379/202.01 |

OTHER PUBLICATIONS

Ken Withee et al., "Configure PIN-less meeting join in Skype for Business Server", https://docs.microsoft.com/en-us/skypeforbusiness/manage/conferencing/pin-less-meeting-join, Jul. 24, 2018, 1 page.

(Continued)

*Primary Examiner* — Harry S Hong
(74) *Attorney, Agent, or Firm* — Edell, Shapiro & Finnan, LLC

(57) ABSTRACT

A computer-implemented method is provided that includes receiving a telephone call placed by a device associated with a user. The user is identified based on a caller identifier obtained from the telephone call. A user identifier is determined for the user based on the caller identifier. Using the user identifier, access is made to a calendar associated with the user to determine from the calendar for the user whether there are any online meetings scheduled for the user at or near a current time. When there is at least one online meeting in the calendar for the user at or near the current time, the user is joined to the at least one online meeting, which results in connecting the telephone call to an audio portion of the at least one online meeting served by a meeting service.

20 Claims, 6 Drawing Sheets

(56) References Cited

OTHER PUBLICATIONS

BlueJeans Support, "Speed-dial into meeting from your mobile", https://support.bluejeans.com/knowledge/speed-dial, Jul. 23, 2018, 3 pages.
LogMeIn Community, "cell phone friendly dial in", https://community.logmein.com/t5/GoToMeeting-Discussions/cell-phone-friendly-dial-in/td-p/162196, May 16, 2015, 8 pages.
A. Johnston et al., "Session Initiation Protocol (SIP) Call Control—Conferencing for User Agents", Network Working Group, Request for Comments: 4579, BCP: 119, Category: Best Current Practice, Nov. 12, 2018, 44 pages.

* cited by examiner

US 10,630,843 B1

DIALING INTO A MEETING WITHOUT ENTERING INFORMATION

TECHNICAL FIELD

The present disclosure relates to online meetings.

BACKGROUND

Online meetings have been proven very useful to increase productivity and collaboration when the parties involves are located remotely from each other. Users may use their desktop computers, laptop computers, tablet devices and even smartphones to join online meetings. However, there are times when joining a meeting from a computer (desktop or laptop) or tablet is not possible.

DESCRIPTION OF EXAMPLE EMBODIMENTS

Overview

Figure 1:
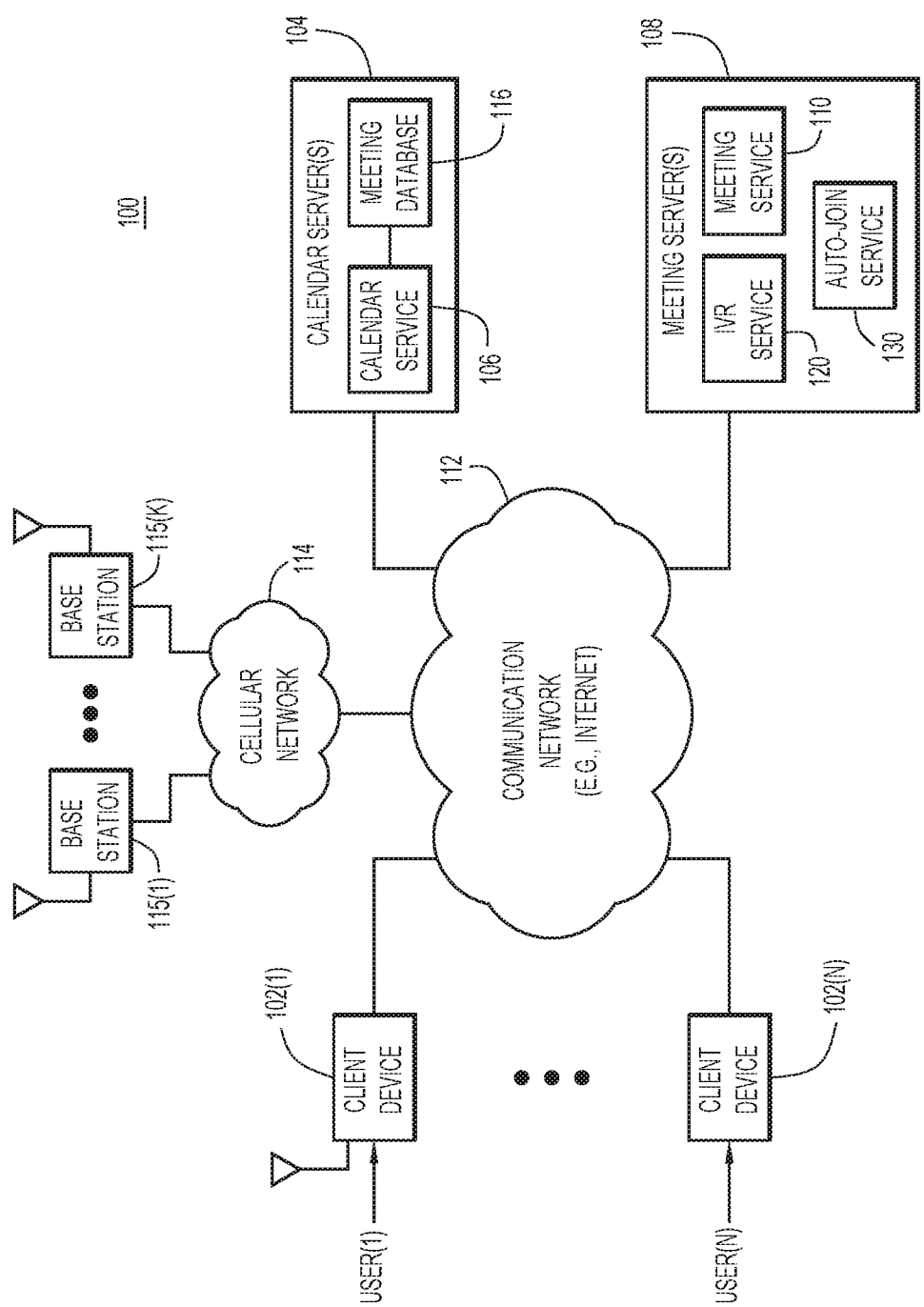
FIG. 1 is a diagram illustrating a network environment in which techniques for facilitating minimal or hands-free user interaction to join a meeting, according to an example embodiment.

In accordance with an embodiment, a computer-implemented method is provided. The method includes receiving a telephone call placed by a device associated with a user. The user is identified based on a caller identifier obtained from the telephone call. A user identifier is determined for the user based on the caller identifier. Using the user identifier, access is made to a calendar associated with the user to determine from the calendar for the user whether there are any online meetings scheduled for the user at or near a current time. When there is at least one online meeting in the calendar for the user at or near the current time, the user is joined to the at least one online meeting, which results in connecting the telephone call to an audio portion of the at least one online meeting served by a meeting service.

EXAMPLE EMBODIMENTS

There are times when it is desirable for a user to be able to join an online meeting when the user is driving a vehicle or otherwise not able to access the meeting in the normal manner that involves the use of the user's hands to enter an identifier, etc. Moreover, the user may want audio only connectivity to a meeting, over the Public Switched Telephone Network (PSTN).

The common work flow is that the user picks up his phone, unlocks it, launch the meeting application on the phone, hits 'join' on a user interface screen (assuming the user does not need to authenticate with the meeting service), hits a 'callback' button on the user interface screen, waits for his phone to ring, answers the call, and then hits 1 on his phone's keypad.

This would be dangerous for a user to do if he is driving a car or other vehicle. Some users directly dial-in to a meeting by memorizing the meeting identifier (ID) from the calendar invite. This requires them to look at their phone quite closely, which is even more dangerous if operating a vehicle.

What is desirable is a completely hands-free way to join the audio portion of a meeting audio while operating a vehicle. The user would not need to look at the phone, or pick up the phone or enter any information to the phone.

Presented herein are techniques to enable dialing into an online meeting/teleconference without the need for the user to enter any information with his/her hands. This is particularly useful when a user wishes to join a meeting/teleconference while driving a vehicle. Hands-free interaction in this type situation is important.

Generally, the solution presented herein is as follows. There is a well-known phone number for the auto-join (hands-free) meeting join feature. For example, "1-800-WXASSIS". A user programs this number into the mobile address book of their mobile user device (e.g., smartphone, tablet, laptop, etc.). The user may associate a name with this phone number, such as the name of the meeting service, e.g., "WebEx®" meeting service. While driving a vehicle, the user can use the dialing feature of a wireless system, e.g., Bluetooth® wireless system, in their car, and say, "Call WebEx". This causes the wireless system to dial out, through the user's mobile user device, the number 1-800-WXASSIS. If the user only has a single meeting in their calendar scheduled for the current time, they are connected directly into the meeting, as an audio participant only since the user is driving the vehicle and cannot view any video portion of the meeting. If the user has multiple meetings scheduled on his/her calendar, they are prompted with a list of meetings and asked which one he/she wants to join. The user provides an answer is connected into the appropriate meeting.

Referring first to FIG. 1, a diagram is shown of a network environment 100 in which embodiments presented herein may be implemented and deployed. Network environment 100 includes multiple user devices 102(1)-102(N) (also referred to as "client devices" 102(1)-102(N)) operated by respective users user(1)-user(N), a calendar server 104 to host a calendar service 106, a meeting server 108 to host a meeting service 110, and a communication network 112 over which the client devices, calendar service, and meeting service communicate. Communication network 112 may be any one or more of a wired or wireless local area network (LAN) and wired or wireless wide area network (WAN), including the Internet. Communication network 112 may support a variety of protocols, including without limitations, Session Initiation Protocol (SIP), Hypertext Transfer Protocol (HTTP), Real-time Transport Protocol (RTP), etc.

One or more of the client devices may be a mobile user device, such as a smartphone or tablet with cellular communication capability. For example, client device 102(1) may be a mobile user device that has cellular voice (as well as data) communication capability. Client device 102(1) may have connectivity through a cellular network 114 that includes number base stations 115(1)-115(K) positioned within coverage areas of a cellular service provider.

FIG. 1 also shows an Interactive Voice Response (IVR) service 120 that may run on one of the meeting servers 108 or on a server completely separate from the meeting servers 108. There is also an auto-join service 130 that runs on one of the meeting servers 108 or on a server completely separate from the meeting servers 108.

Calendar service 106 interacts with client devices 102(1)-102(N) to enable users of the client devices to schedule online meetings with each other, and the calendar service 106 also maintains a meeting database 116 of meeting information for all such scheduled online meetings. As an example, the calendar service 106 may be by embodied by a Microsoft Exchange® server or other similar calendar server software now known or hereinafter developed. Meeting service 110 accesses the meeting information maintained by calendar service 106 and uses that information to manage and provide resources for the meetings, such as a web-based meeting or a CMR/PMR meeting. The terms personal meeting room (PMR) and collaboration meeting room (CMR) are used interchangeably herein. In general, a web-based or online meeting is a meeting that is conducted over the Internet and managed by a meeting server (e.g., meeting server 108) that presents web-pages to each client device that is connected to the same meeting to mimic a collaborative environment in which users can converse in audio, video and electronically share documents and other data in real-time. A distinction may be drawn between the concept of an "online meeting" and the concept of a "PMR." An online meeting is a scheduled event with a given start time and a given end time based on a calendar, for example. The PMR is a place or web-environment in which an online meeting can take place; it has the property that users connected to or in the place are able to see and hear each other at the same time. An online meeting has a unique meeting identifier (ID), this can be considered an iCalendar (iCal) Universally Unique Identifier (UUID), or unique per instance of any scheduled meeting. A PMR is uniquely identified by its PMR Uniform Resource Identifier (URI) (e.g., jdoe@go.webex.com). Consequently, a first online meeting (meeting1) can be scheduled back-to-back with a second online meeting (meeting 2). Both can take place in the same PMR. There are two distinct meetings, and one distinct PMR. The terms "online" and "web-based" are synonymous and may be used interchangeably herein.

While FIG. 1 shows a single meeting server 108, it is to be understood that there may be multiple meeting servers distributed throughout a geographical area in order to support numerous web-based meetings between client devices. Moreover, there may be multiple instances of calendar server 104 for similar reasons.

Client devices 102(1)-102(N) may each take on a variety of forms, including a smartphone, tablet, laptop computer, desktop computer, video conference endpoint, and the like. Client devices 102(1)-102(N) may each run a calendar application and may also host a web conference client application that communicates with the calendar application. However, a video conference endpoint used to participate in a conference session does not have a calendar application running on it. Users of client devices 102(1)-102(N) may use the calendar applications to schedule online meetings into a user calendar at a date and time in the future. The calendar applications are capable of generating a meeting (i.e., generating a meeting appointment) and sending a meeting invitation to users, i.e., other client devices, as well as receiving a meeting invitation from other users. When a user accepts a meeting invitation, the calendar application stores information for the meeting. Calendar service 106 creates calendar events, e.g., online meetings, based on messages from client devices 102(1)-102(N), and then compiles that information into meeting records in meeting database 116. Meeting information compiled by calendar service 106 for a given online meeting may include all, or a subset of, the following items: a unique identifier for the meeting; an identifier of a host of the meeting; a list of invitees (i.e., invitee identifiers) to the meeting; and a start time and an end time of the meeting. The identifier of the host and each invitee identifier may each include one or more of a name and an email address, for example.

Client devices 102(1)-102(N) and calendar service 106 may use any number of available calendar and meeting scheduling tools to perform the operations mentioned above to schedule meetings and build meeting database 116, which is accessible to meeting service 110. In an example, operations to schedule a meeting into a calendar of user may be performed using the Microsoft Outlook® software application and Outlook plugins on client devices 102(1)-102(N), such as WebEx® productivity tools. Such tools automatically add meeting links into a calendar invite. Furthermore, these tools can communicate to the meeting service 110, information about a scheduled meeting, such as the start time, stop time, invitees, forwards, and so on. Alternatively, Hybrid calendar technologies implemented as part of meeting service 110 may also be used. Hybrid calendar technologies leverage server-side calendar integrations using calendaring application programming interfaces (APIs), such as Exchange Web Services (EWS) or Representational State Transfer (REST) APIs. Such server-side calendar integrations (e.g., implemented in calendar service 106) allow applications—such as the meetings service 110—to have full access to the calendars of users. This means the server-side calendar integrations have access to scheduled online meetings and, for each online meeting, email addresses of participants invited to the meeting, a list of attendees to whom an invitation to the online meeting was forwarded, a list of recipients of the forwarded invitation and who accepted and declined the forwarded invitation, and start and stop times of the meeting. Over time, as/if the invitee list of an online meeting changes as a result of any of the aforementioned acts, the server-side calendar integrations of meeting service 110 will be able to access updated meeting records in meeting database 116.

Meeting service 110 communicates with the calendar service 106 to obtain access to information in the meeting database 116 for controlling admittance of a client device (user) to a web-based meeting, in accordance with the embodiments described herein. Thus, the meeting service 110 may query the meeting database 116 at the time a decision is to be made by the meeting service 110 to admit a user to a meeting, or it may be in communication with the meeting database 116 on a periodic basis, or may maintain a mirror copy of the content of the meeting database 116, updated as needed, such as when there are changes.

Figure 2:
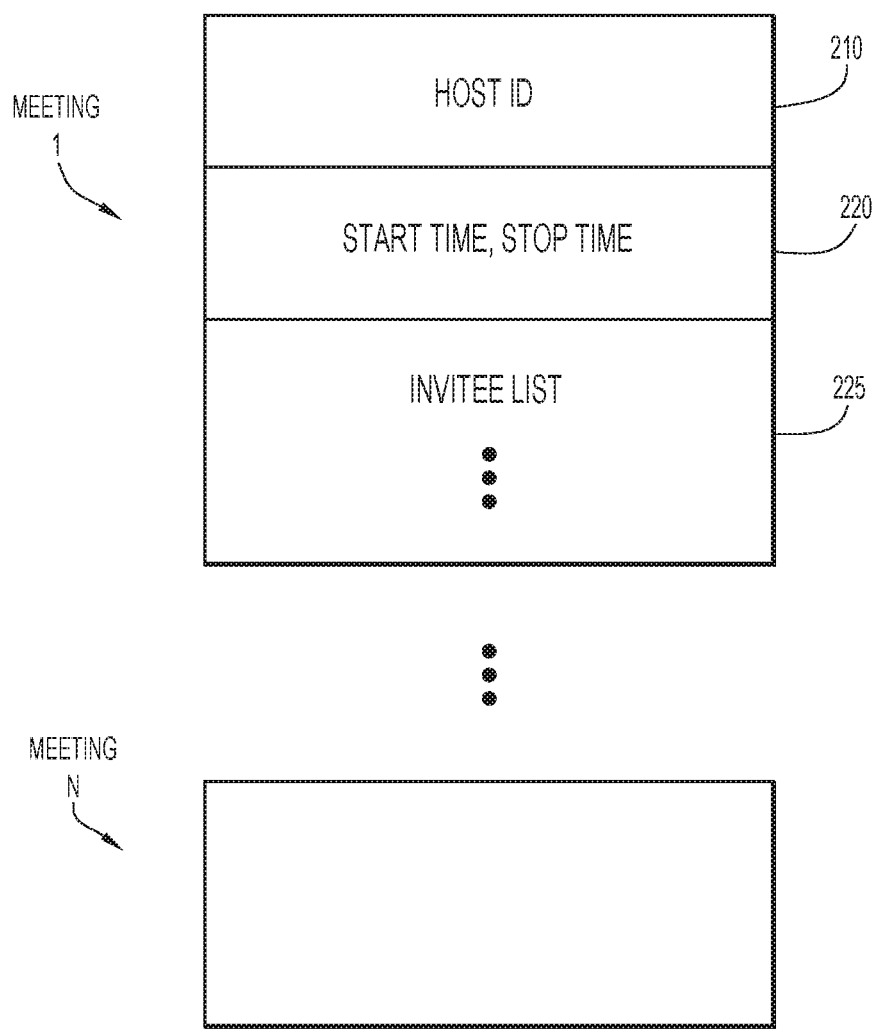
FIG. 2 is an illustration of an example of meeting database of online meeting records used to assist with determining to which meeting to join a user, according to an example embodiment.

With reference to FIG. 2, there is an illustration of an example of meeting database 116. Meeting database 116 includes meeting records meeting1-meetingN each for a corresponding one of N scheduled online meetings. Calendar service 106 compiles meeting records meeting1-meetingN as described above and shares the records with meeting service 110 as needed for the methods described below. In other examples, portions of meeting database 116, including a subset of meeting records meeting1-meetingN, may be stored on meeting server 108 so as to be local to meeting service 110.

Meeting record meeting1 may take different forms depending on the type of meeting resource to which the online meeting applies, such as a PMR/CMR, WebEx® meeting, and so on. Meeting record meeting1 may include a host ID 210 of the host of the meeting, such as a hostname and a host email address, start and stop times 220, and a list of invitees (i.e., a list of participants invited to the meeting) 225. The list of invitees 225 may include identifiers of each invitee, e.g., a name and an email address of each invitee. The other meeting records may include information similar to record meeting1, or a subset of that information particular to the respective meeting represented by the meeting record. Similarly, meeting1 may be a recurring meeting in which case start-time and stop-time 220 may include multiple times. Alternatively, meeting1 may be a single instance of a recurring meeting.

Mobile Number Verification

In advance of a meeting, a user needs to verify his/her mobile telephone number and have it associated with his/her meeting service user account. For example, the user would log into the meeting application (on a mobile device) or desktop meeting application on a laptop or desktop computer, a web-based application and enter his/her mobile number to the meeting service, receive a text with a code and enter the code into their device which sends a message to the meeting service. The meeting service then knows that the code returned to the meeting service came from the user who entered that mobile number. Thus, the user's mobile number is now verified with the meeting service and associated with that user's meeting service account.

Additional techniques may be used, as described further below. In any case, the user has a verified mobile number associated with their meeting service account.

Secure Caller Identification (ID)

When a user dials the meeting service number, e.g., 1-800-WXASSIS, the meeting service identifies the user based on their caller ID. Some systems do this by asking the user to enter an additional personal identification number (PIN) code. While this works, it can be burdensome and difficult to configure as a contact in a mobile address book.

To remedy this, the meeting service 110 may inherently trust the caller ID to be accurate. However, the meeting service may send a text to that number informing the user that someone has joined a meeting on their behalf. This allows the meeting service to catch fraud cases or other errors, as described further below.

Calendar Association

Once the user has dialed the number associated with the meeting service hands-free join function, and the meeting service has identified the user based on the caller ID, the system obtains the user's calendar from the calendar server 104. This may involve calendar integration technologies. For example, some meeting services support calendar connectors with on-premise exchange, cloud exchange, Google® calendar, and so on. The meeting server 108 pulls information from the calendar for that user, and identifies for that user the meetings which are currently active based on current time of day. There may be zero, one, or two or more meetings in the calendar for the current time.

Trusted Caller ID and Name-Number Association

Trusting a caller ID is not always trivial. Moreover, neither is associating a name with a number.

Many users that dial into a meeting will have, at one point in time, joined a meeting by launching the desktop application and either dialing in with an attendee ID, or receiving a callback from the meeting service. This very-common step in a meeting join process provides, as a side effect, a verification of the associated number as belonging to the user that is joining the meeting. Consequently, the meeting service can use the normal (and very common) process of meeting joining as a way to build up a database of verified numbers associated with user accounts, and use the display names and emails in those accounts for providing the user names in the meeting roster.

For each user that is provisioned into the meeting service 110, the meeting service keeps track of the set of verified numbers for that user. Initially, this is empty. Every user provisioned into the meeting service has a display name and an email address. The verified numbers for each user account are populated through the process of meeting joins initiated from the meeting application in cases where the user has authenticated to the meeting service, and furthermore has elected to join the audio via dial-in or callback. This dramatically reduces the barriers to entry to build up a database of verified numbers, which is otherwise a burdensome process for the user.

Consider first the case of a user opening the meeting application to join a meeting, authenticating as normal, and then electing to join the audio portion of a meeting by receiving an audio callback. The user's phone will ring. The user answers and often is given an IVR prompt asking the user to confirm (join the meeting) by pressing "1" on their phone. If the user presses "1" to confirm, the user is joined to the meeting.

Furthermore, at that point in time the meeting application may prompt the user, inquiring: "Is this your personal desk or mobile phone?" The user will have three options—"desk", "mobile" or "not mine". The "not mine" case is for when a user joins a meeting from a conference room and has the system call them back at that number. If the user indicates either "desk" or "mobile", the meeting service 110 remembers this and associates the callback number with that user's account. In the case of the user dialing in, if the user performs the dial-in, and enters their attendee ID, the meeting service examines the caller ID of the associated inbound call. The IVR service 120 prompts the user saying, "You joined from <number>. Is this your personal desk or mobile phone?" Then, there is an option for "desk", "mobile", or "neither". The "neither" option covers cases where the user has joined from a conference phone or the caller ID is inaccurate. If the user confirms, once again the meeting service associates the number with the user's account.

If that number is already associated with another user, the meeting service 110 sends an email, and optionally a text (for mobile numbers) saying something like "Someone has just associated your number with an account. If this was not you, please click here". This would bring the user to a site to manage their numbers including re-verifying via a text or callback. This is an error condition and would only happen in fraudulent cases.

At a later time, that same user may elect to join a meeting but will actually dial-in to the meeting without first joining from the meeting application. This happens commonly for example when a user is driving and requires audio-only, as described herein. In such a case, the meeting service 110 examines the caller ID, and matches it to the users in the system which have a verified number. If there is a match, and it matches a single user's account, the display name associated with that user may be shown in the meeting roster.

In order to handle cases of users sending malicious caller ID, the meeting service 110 may send an email, and if the number is a mobile number, the meeting service sends a text, to the user. This email/text may say, "Someone has just joined a meeting claiming to be you. If this was not you, please click here. Otherwise, you can safely ignore this email/text". Clicking the link causes that user to be disconnected from the meeting and flags an alert in the meeting service for possible fraud.

Interactive Voice Response (IVR)-Free Meeting Join

Figure 3:
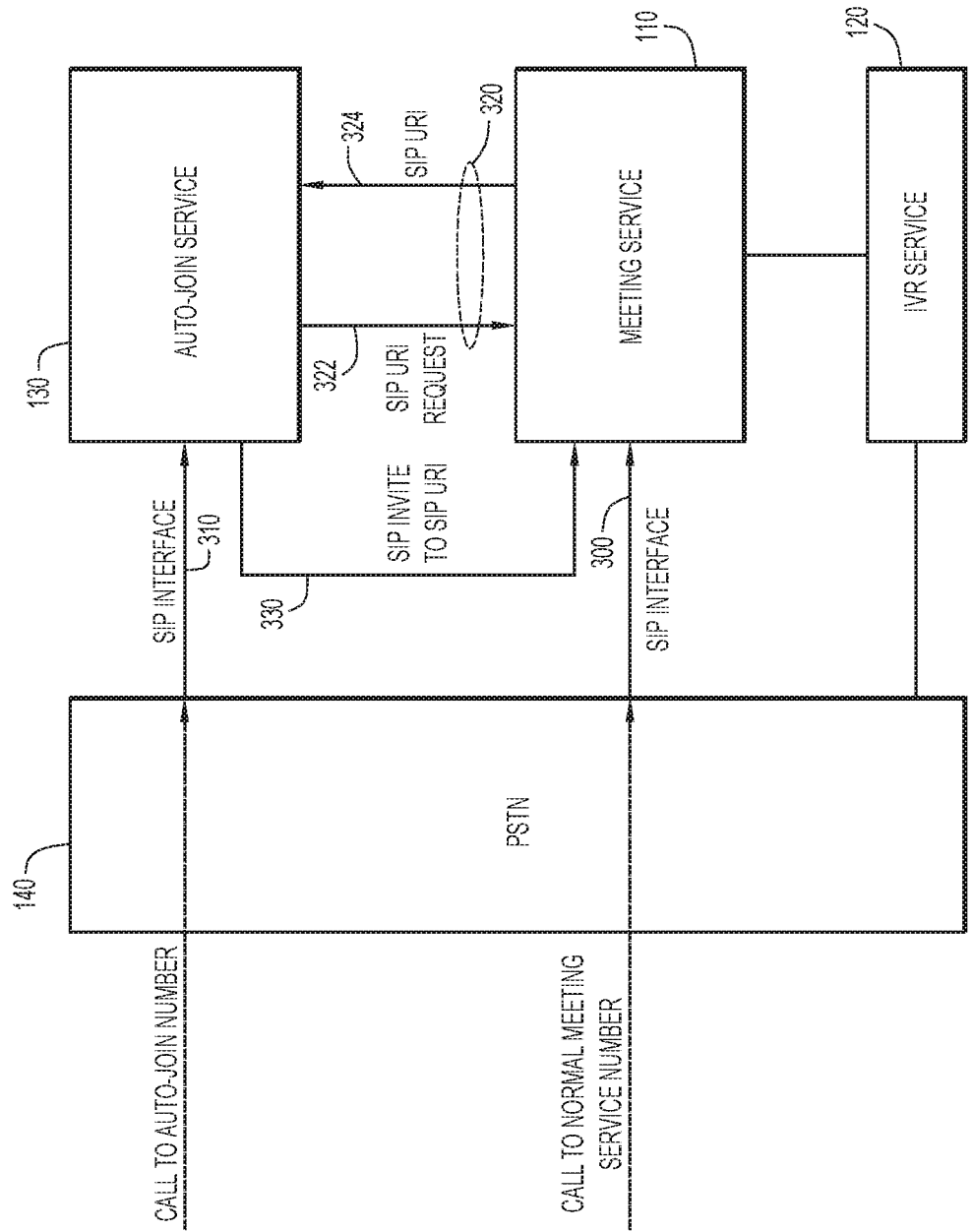
FIG. 3 is a diagram illustrating interaction between an auto-join service and a meeting service in facilitating minimal or hands-free user interaction to join a meeting, according to an example embodiment.

Reference is now made to FIG. 3, with continued reference to FIG. 1. FIG. 3 is a functional diagram illustrating the interactions of the meeting service 110, IVR service 120 and auto-join service. FIG. 3 shows how calls are routed by the Public Switched Telephone Network (PSTN) 140. The connection between the PSTN 140 and the meeting service 110 is a standard Session Initiation Protocol (SIP) interface 300, or other similar interface now known or hereinafter developed. There is also a separate SIP interface 310 to the auto-join service 130 from the PSTN 140. Consequently, as depicted in FIG. 3, calls to the normal meeting service join telephone number are directed by the PSTN 140 to the meeting service 110 via SIP interface 300, whereas calls to the aforementioned dedicated auto-join service number are directed by the PSTN to the auto-join service 130 via SIP interface 310.

Normally, when the meeting service 110 receives a SIP call for a normal meeting join experience via SIP interface 300, the meeting service 110 invokes the IVR service 120 to prompt the user to enter the meeting ID and his/her user ID. In order to minimize changes to the meeting service 110, the auto-join service 130 is separate from the meeting service 110. As described above, the auto-join service 130 receives calls from the phones of users who call the dedicated auto-join number. That number, when called, routes (via the PSTN 140) a SIP call via SIP interface 310 to the auto-join service 130, and thus is distinct from the number typically used to call into the meeting service 110 directly. The auto-join service 130 performs the functions of looking at the caller ID of the incoming call, matching the caller ID against a known user, obtain access to the calendar for that user, plays an IVR (if needed), and when it knows what meeting is to be joined—pass the SIP call to the meeting service 110.

In one form, the meeting service 110 exposes a privileged/secure REST API shown at 320 in FIG. 3. This REST API 320 takes, as input from auto-join service 130 a SIP URI request 322. In one form, the REST API 320 uses the Hypertext Transfer Protocol (HTTP). The SIP URI request 322 includes the meeting ID of the meeting to join, and a user identifier. The user identifier may be, for example, a universally unique identifier (UUID) of a device used by the associated user. The meeting service 110 returns, at 324, a SIP URI whose user part is the encrypted version of the user identifier and the meeting ID, encrypted with a key known to the meeting service 110.

The following describes in more detail how the SIP URI is generated. The auto-join service 130 invokes the API 320 and requests the meeting service 110 to generate a SIP URI that encodes the meeting ID and user ID. For example, the auto-join service 130 invokes an HTTP request to the meeting service 110 with the following HTTP POST:

HTTP POST http://meeting-service.com?meetingID=23456&userID=UserXYZ

Then, in one embodiment, the meeting service 110 generates a JavaScript Object Notation (JSON) object that provides the meeting SIP URI:

{"sip-uri":"sip:7hatgs7s9akkwgc7@sip.meetingservice.com"}

As shown at 330, the auto-join service 130 sends a SIP INVITE to the SIP URI that it received at 324 from the meeting service 110, which arrives at the meeting service 110. The meeting service 110 recognizes this URI (having just allocated it) and thus places the user into an associated meeting.

In an alternative embodiment, the auto-join service 130 can directly generate the SIP URI without interacting with the meeting service via API 320. For example, once the auto-join service 130 has determined the meeting ID and user ID, the auto-join service 130 may send an outbound SIP INVITE at 330 to the SIP URI:

Sip:meetingID-23456-userID-userxyz@sip.meetingservice.com

The meeting service 110 recognizes this URI as encoding the user ID and meeting ID, extracts the user ID and meeting ID information from the URI, and then places the user straight into the meeting. This latter approach is easy to implement into a meetings service and involves minimal changes. This makes it straightforward to add the auto-join feature to an existing meeting service. The former approach is slightly more secure because it involves cryptographically encoding the user ID and meeting ID in the URI, thereby ensuring that users can be auto-joined only by dialing into the auto-join service 130 first.

Figure 4:
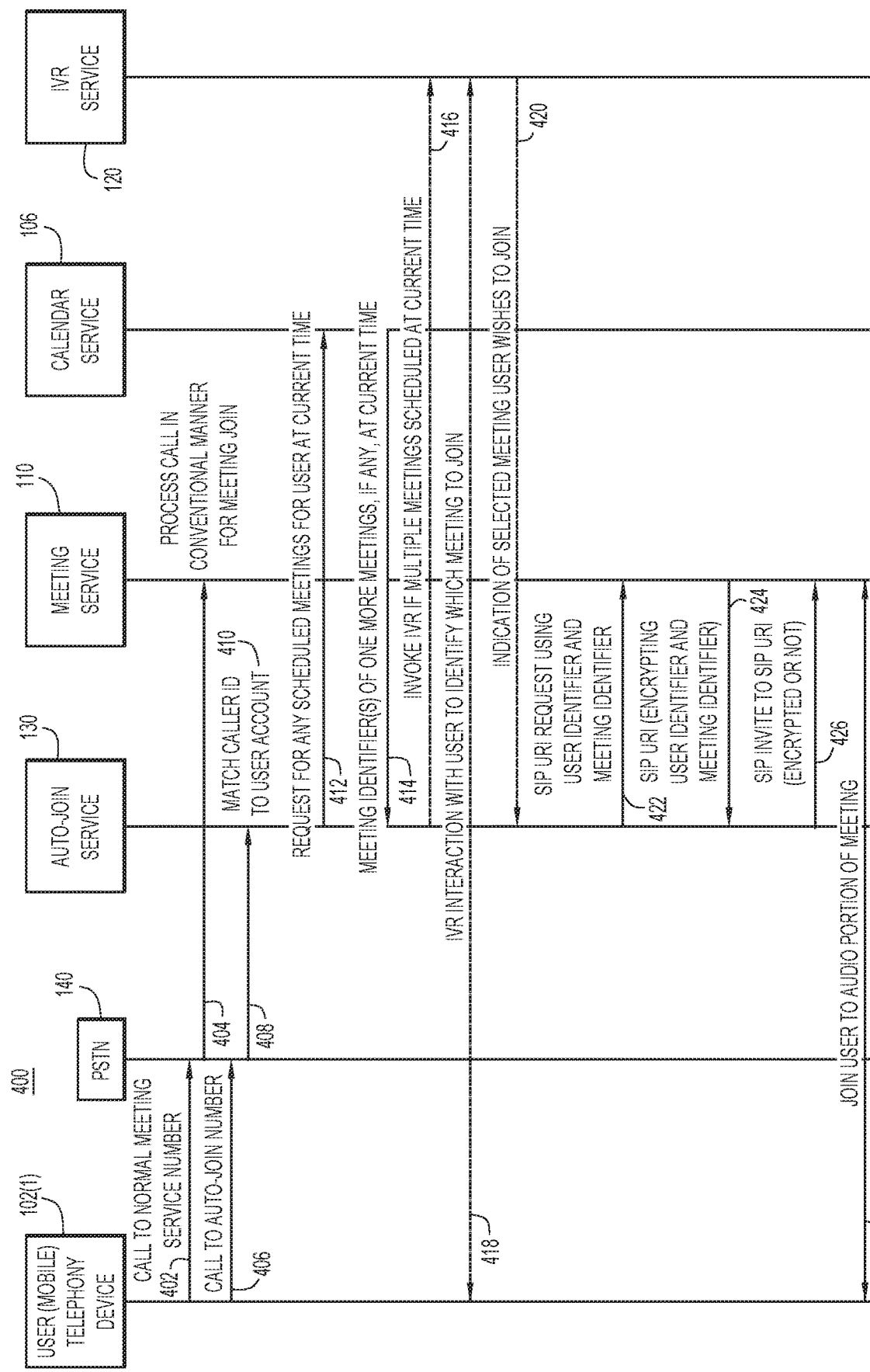
FIG. 4 is a sequence diagram depicting interactions between various entities and services in facilitating minimal or hands-free user interaction to join a meeting, according to an example embodiment.

Turning now to FIG. 4, with continued reference to FIGS. 1 and 3, a more comprehensive call flow/sequence diagram for a process 400 is described. At 402, a user telephone device, e.g., device 102(1), makes a call to the normal meeting service number. At 404, the PSTN 140 directs the call to the SIP interface (e.g., SIP interface 300 shown in FIG. 3) of the meeting service 110 and the meeting service processes the call in a conventional manner for joining the user to a meeting. The call may originate for a mobile telephone device, but this is not meant to be limiting. Operations 402 and 404 are shown in FIG. 4 for completeness.

By contrast, at 406, the user device 102(1) makes a call to the aforementioned dedicated auto-join number. At 408, the PSTN 140 directs this call to the SIP interface 310 of the auto-join service 130. At 410, the auto-join service matches the caller ID of the incoming call to a user account. If there is a matching user account know to the service for the user, then the auto-join service 130 sends a query to the calendar service 106 for that user, to obtain access to the user's calendar in order to determine if there are any scheduled meetings for the user at the current time (the time at which the user has called the auto-join service). This may involve the calendar service 106 querying its meeting database to retrieve any meetings for that user, as shown in FIG. 2.

At 414, the calendar service 106 returns to the auto-join service 130 the meeting identifier(s) of the one or more meetings, if any, at or near the current time. If there are multiple meetings scheduled for the user at or near the current time, then the auto-join service 130 may, at 416, invoke the IVR service 120 to interact with the user in order to identify which meeting the user wants to join. This interaction with the user is shown at 418. When the IVR service 120 obtains from the user an indication of which meeting the user wishes to join, at 420, the IVR service 120 returns that indication to the auto-join service 130. At this point, the IVR service 120 knows which meeting the user wishes to join. If it is determined at 412 that there are no meetings scheduled for the user at or near the current time, it is to be understood that the process 400 ends. The user is not admitted to any meetings, and a voice message to such effect may be presented the user.

However, assuming there is only one meeting at or near the current time (returned to the auto-join service 130 at 414) or the user has indicated which of the multiple meetings at or near the current time that he/she wishes to join, the auto-join service 130 can initiate the SIP URI request described above in connection with FIG. 3. Specifically, at 422, the auto-join service 130 sends a request, via the API 320 shown in FIG. 3, to the meeting service 110 for a SIP URI. At 424, the meeting service 110 returns a SIP URI encrypting the user identifier and meeting identifier (corresponding to the meeting the user wishes to join). Alternatively, as described above in connection with FIG. 3, the auto-join service 130 may generate the SIP URI directly from the meeting identifier and user identifier, without requesting it from the meeting service 110, and in which case the SIP URI will not be encrypted. At 426, the auto-join service 130 sends a SIP INVITE to the SIP URI (encrypted by the meeting service or unencrypted because it was directly generated by the auto-join service). The meeting service 110 receives the SIP INVITE and recognizes the URI (having just allocated it if the operations 422 and 424 are followed) or because the URI directly contains the meeting information (the SIP URI was unencrypted and generated by the auto-join service 130). At 430, the meeting service 110 joins the user to the audio portion of the meeting corresponding to the meeting identifier indicated in the SIP URI.

Figure 5:
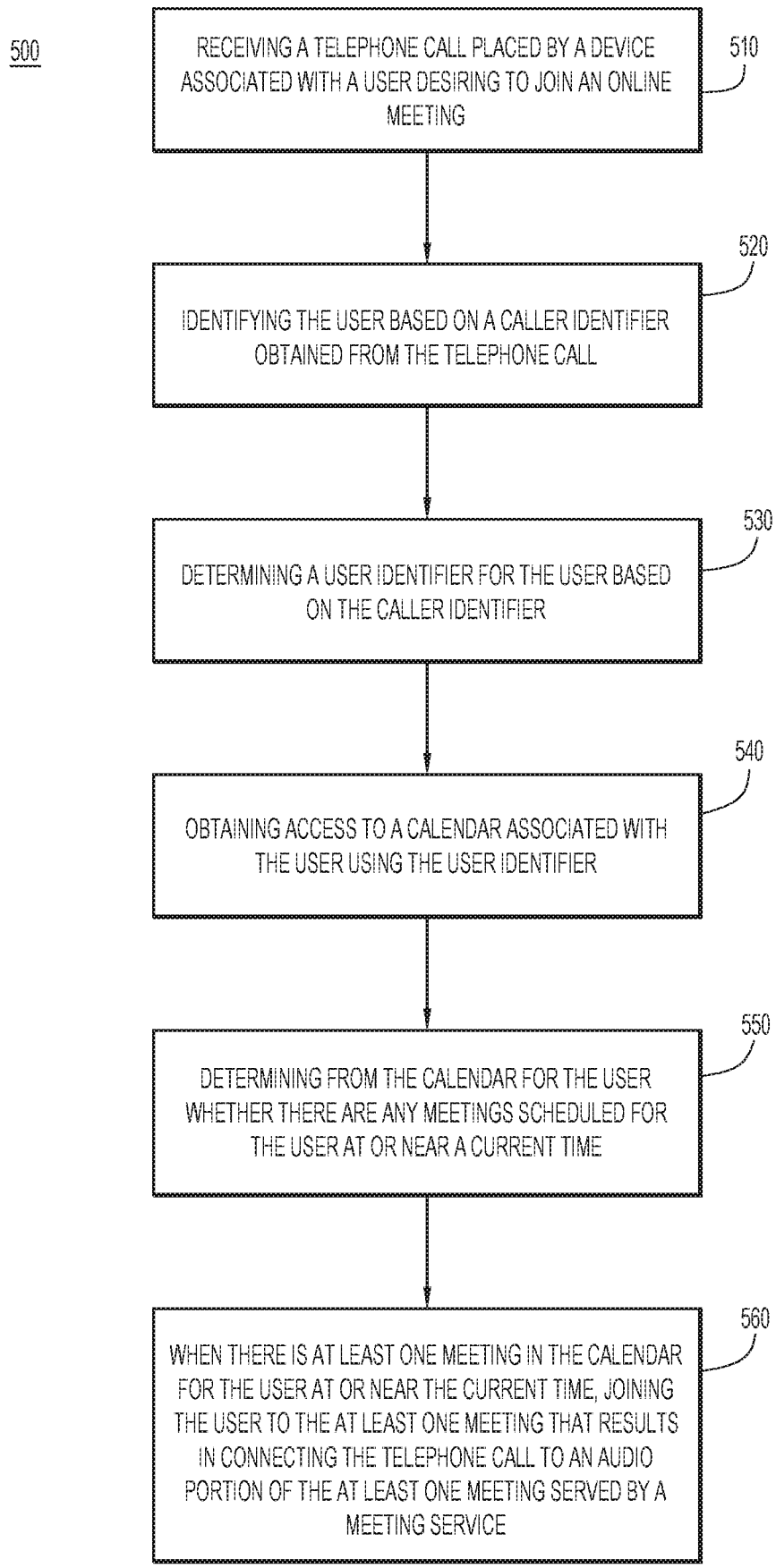
FIG. 5 is a flowchart of a high-level method of facilitating minimal or hands-free user interaction to join a meeting, according to an example embodiment.

Reference is now made to FIG. 5. FIG. 5 shows a flow chart of a computer-implemented method 500 provided according to an example embodiment. The method is 500 is generally performed by the auto-join service 130 configured to provide a hands-free meeting join function, as described above. Reference is also made to FIGS. 1-4 in connection with the description of FIG. 5. At 510, the auto-join service receives a telephone call placed by a device associated with a user. The user may be a user desiring to join an online meeting. This telephone call is placed to a telephone number dedicated to a hands-free join function provided by the auto-join service. The auto-join service is in communication with the meeting service that serves online meetings. As depicted in FIG. 3, calls to this telephone number is directed by the PSTN 140 to the SIP interface 310 of the auto-join service. Thus operation 510 may involve receiving the telephone call at the auto-join service configured to provide a hands-free meeting join function.

At 520, the auto-join service identifies the user associated with the incoming telephone call based on a caller identifier obtained from the telephone call.

At 530, the auto-join service determines a user identifier for the user based on the caller identifier.

At 540, the auto-join service obtains access to a calendar associated with the user using the user identifier. Calendar access is described above in connection with FIGS. 1 and 2. At 550, the auto-join service determines from the calendar for the user whether there are any online meetings scheduled for the user at or near a current time. The current time is the time at which the telephone call is received by the auto-join service. When it is determined that there are two or more online meetings scheduled at or near the current time in the calendar for the user, the method may further include generating an IVR prompt to be played to the user for the user to select which of the two or more online meetings to which to join the user.

At 560, when there is at least one online meeting in the calendar for the user at or near the current time, the auto-join service initiates actions to join the user to the at least one online meeting that results in connecting the telephone call to an audio portion of the at least one online meeting served by a meeting service.

As described above, the method 500 may further include: generating a SIP URI based on the user identifier and a meeting identifier of the meeting; and sending a SIP INVITE message to the SIP URI, the SIP INVITE message destined to a SIP interface of the meeting service. In this case, joining includes the meeting service connecting the user to the audio portion of the meeting based on the meeting identifier included in SIP URI. In one form, the auto-join service generates the SIP URI and the meeting identifier and user identifier are not encrypted.

In another form, the auto-join service sends to the meeting service a request for the SIP URI, and the meeting service generates the SIP URI, including cryptographically encoding the user identifier and the meeting identifier in forming the SIP URI. The meeting service returns the SIP URI to the auto-join service. More specifically, in this case, the meeting service receives from the auto-join service the SIP URI of the SIP INVITE message, decodes from the SIP URI the meeting identifier and the user identifier, and connects the telephone call into the audio portion of the online meeting without any interactive voice response prompts that would normally be presented to the user connecting into an online meeting via the SIP interface of the meeting service.

The method 500 may include further operations to provide additional levels of security to the process. For example, the method may further include sending a text message to a phone number in the caller identifier of the incoming telephone call, the text message indicating that a meeting join has been made on behalf of the user. This will allow the user to indicate to the meeting service when he/she did not initiate the meeting join and thus there is somebody fraudulently attempting to join online meetings using his/her user identifier and/or phone number.

Further still, the meeting service may learn the phone number of the user through a variety of methods. For example, in one form, the meeting service may register the phone number associated with the user through a phone number verification process, for use in subsequently determining the user identifier for the user using the caller identifier. In another form, the meeting service may learn a phone number associated with the user by associating the phone number with a user account when the user has entered the phone number for purposes of receiving a callback to join an audio portion of a previous online meeting.

Figure 6:
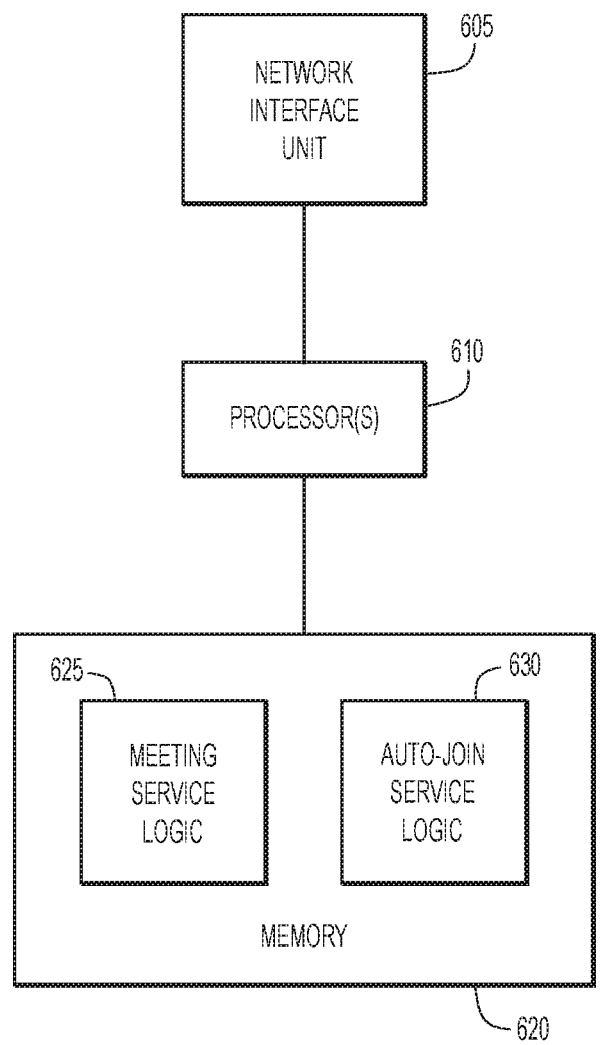
FIG. 6 is a block diagram of a computer device/apparatus to host the auto-join service and the meeting service and perform the operations described herein, according to an example embodiment.

With reference to FIG. 6, there is a block diagram of an example computer device (e.g. server) 600 for the services used in the embodiments presented herein, including the meeting service and auto-join service. Computer device 600 may represent meeting server 108. Computer device 600 includes network interface unit 605 to communicate with a wired and/or wireless communication network so as to communicate with calendar service 106 and client devices 102, a processor 610 (or multiple processors), and memory 620. Network interface unit 605 may include an Ethernet card (or multiple such devices) including one or more network ports to connect with and communicate over wired Ethernet links and/or a wireless communication card including a wireless transceiver and an antenna to communicate over wireless links. The processor 610 is, for example, a microprocessor or a microcontroller that executes instructions stored in memory 620.

Memory 620 stores instructions for implementing methods described herein. Memory 620 may include read only memory (ROM), random access memory (RAM), magnetic disk storage media devices, optical storage media devices, flash memory devices, electrical, optical, or other physical/tangible (non-transitory) memory storage devices. Thus, in general, the memory 620 may comprise one or more tangible computer readable storage media (e.g., a memory device) encoded with software comprising computer executable instructions and when the software is executed (by the processor 610) it is operable to perform the operations described herein. Memory 620 stores meeting service logic (software) 625 for the meeting service 110 and auto-join service logic 630 for the auto-join service 130 described herein, so as to implement the methods described herein. The memory 620 may also store data used and generated by the meeting service logic 625 and auto-join service logic 630.

In summary, presented herein are embodiments that provide a way for a user to dial into meetings without entering a meeting ID or attendee ID. Users verify their mobile numbers ahead of time. When they dial a special telephone number (e.g., 1-800 number) at the time of their meeting, a method is provided that takes the caller ID and matches it to a user account. A text message may be sent to that number to let the user know someone (hopefully the user) has joined a meeting with the user's mobile number. The system queries the user's calendar to find the meeting to join. A SIP URI is generated for joining the meeting service that bypasses the IVR prompts by encoding the meeting ID and user ID into the SIP URI itself. The caller is then 'transferred' to that SIP URI and thus the user joins the (audio portion of the) meeting without prompts.

In addition, techniques are provided by which a database of verified telephone numbers for meetings users is built up. These techniques use the normal process of callbacks and dial-ins that are initiated by a meeting application. With such a database, when a user dials in without joining from the meeting application, a comparison is made of the caller ID with the growing database of verified numbers. To deal with a fake caller ID, the user may be sent a text or email to let the user letting know someone joined a meeting as that user, and providing an option to click if the user did not actually initiate that meeting join.

In one form, a computer-implemented method is provided comprising: receiving a telephone call placed by a device associated with a user; identifying the user based on a caller identifier obtained from the telephone call; determining a user identifier for the user based on the caller identifier; obtaining access to a calendar associated with the user using the user identifier; determining from the calendar for the user whether there are any online meetings scheduled for the user at or near a current time; and when there is at least one online meeting in the calendar for the user at or near the current time, joining the user to the at least one online meeting that results in connecting the telephone call to an audio portion of the at least one online meeting served by a meeting service.

In another form, an apparatus is provided comprising: a network interface configured to communicate enable network communications; and a processor, coupled to the network interface, and configured to: receive a telephone call placed by a device associated with a user; identify the user based on a caller identifier obtained from the telephone call; determine a user identifier for the user based on the caller identifier; obtain access to a calendar associated with the user using the user identifier; determine from the calendar for the user whether there are any online meetings scheduled for the user at or near a current time; and when there is at least one online meeting in the calendar for the user at or near the current time, join the user to the at least one online meeting that results in connecting the telephone call to an audio portion of the at least one online meeting served by a meeting service.

In still another form, a non-transitory computer readable storage media encoded with instructions that, when executed by a processor of a meeting server, cause the processor to perform operations including: receiving a telephone call placed by a device associated with a user; identifying the user based on a caller identifier obtained from the telephone call; determining a user identifier for the user based on the caller identifier; obtaining access to a calendar associated with the user using the user identifier; determining from the calendar for the user whether there are any online meetings scheduled for the user at or near a current time; and when there is at least one online meeting in the calendar for the user at or near the current time, joining the user to the at least one online meeting that results in connecting the telephone call to an audio portion of the at least one online meeting served by a meeting service.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   receiving, by an auto-join service executed by a processor, a telephone call placed by a device associated with a user;
   identifying, by the auto-join service, the user based on a caller identifier obtained from the telephone call;
   determining, by the auto-join service, a user identifier for the user based on the caller identifier;
   obtaining, by the auto-join service, access to a calendar associated with the user using the user identifier;
   determining, by the auto-join service, from the calendar for the user whether any online meetings are scheduled for the user at or near a current time of the auto-join service; and
   when at least one online meeting in the calendar for the user is at or near the current time,
      sending, by the auto-join service to a meeting service, a request for a Session Initiation Protocol (SIP) Uniform Resource Identifier (URI) that is generated, by the meeting service cryptographically encoding the user identifier and a meeting identifier of the online meeting,
      receiving, by the auto-join service, the SIP URI, and
      joining, by the auto-join service, the user to the online meeting based on the SIP URI, and that results in connecting the telephone call to an audio portion of the online meeting served by the meeting service.

2. The method of claim 1, wherein receiving the telephone call includes receiving the telephone call at the auto-join service configured to provide a hands-free meeting join function, wherein the auto-join service is in communication with the meeting service that serves the online meetings.

3. The method of claim 2, further comprising:
   sending a SIP INVITE message to the SIP URI, the SIP INVITE message destined to a SIP interface of the meeting service.

4. The method of claim 3, wherein joining includes:
   receiving from the auto-join service at the meeting service the SIP URI of the SIP INVITE message;

decoding from the SIP URI the meeting identifier and the user identifier; and connecting the telephone call into the audio portion of the online meeting without any interactive voice response prompts that would normally be presented to the user connecting into an online meeting via the SIP interface of the meeting service.

5. The method of claim 1, wherein when it is determined that there are two or more online meetings scheduled at or near the current time in the calendar for the user, further comprising:

generating a prompt to be played to the user for the user to select which of the two or more online meetings to which to join the user.

6. The method of claim 1, further comprising:

sending a text message to a phone number in the caller identifier of the telephone call, the text message indicating that a meeting join has been made on behalf of the user.

7. The method of claim 1, further comprising:

registering a phone number associated with the user through a phone number verification process, for use in subsequently determining the user identifier for the user using the caller identifier.

8. The method of claim 1, further comprising:

learning a phone number associated with the user by associating the phone number with a user account when the user has entered the phone number for purposes of receiving a callback to join the audio portion of a previous meeting.

9. An apparatus comprising:

a network interface configured to communicate enable network communications; and a processor, coupled to the network interface, and configured to:

receive a telephone call placed by a device associated with a user;

identify the user based on a caller identifier obtained from the telephone call;

determine a user identifier for the user based on the caller identifier;

obtain access to a calendar associated with the user using the user identifier;

determine from the calendar for the user whether any online meetings are scheduled for the user at or near a current time of the processor; and when at least one online meeting in the calendar for the user is at or near the current time, send a request for a Session Initiation Protocol (SIP) Uniform Resource Identifier (URI) that is generated by a meeting service cryptographically encoding the user identifier and a meeting identifier of the online meeting, receive the SIP URI, and join the user to the online meeting based on the SIP URI and that results in connecting the telephone call to an audio portion of the online meeting served by the meeting service.

10. The apparatus of claim 9, wherein the processor is configured to receive the telephone call at an auto-join service configured to provide a hands-free meeting join function, wherein the auto-join service is in communication with the meeting service that serves the online meetings.

11. The apparatus of claim 10, wherein the processor is further configured to:

send a SIP INVITE message to the SIP URI, the SIP INVITE message destined to a SIP interface of the meeting service.

12. The apparatus of claim 11, wherein the processor is configured to join by:

receiving from the auto-join service at the meeting service the SIP URI of the SIP INVITE message;

decoding from the SIP URI the meeting identifier and the user identifier; and connecting the telephone call into the audio portion of the online meeting without any interactive voice response prompts that would normally be presented to the user connecting into an online meeting via the SIP interface of the meeting service.

13. A non-transitory computer readable storage media encoded with instructions that, when executed by a processor of a meeting server, cause the processor to perform operations including:

receiving a telephone call placed by a device associated with a user;

identifying the user based on a caller identifier obtained from the telephone call;

determining a user identifier for the user based on the caller identifier;

obtaining access to a calendar associated with the user using the user identifier;

determining from the calendar for the user whether any online meetings are scheduled for the user at or near a current time of the processor; and when at least one online meeting in the calendar for the user is at or near the current time, sending a request for a Session Initiation Protocol (SIP) Uniform Resource Identifier (URI) that is generated by a meeting service cryptographically encoding the user identifier and a meeting identifier of the online meeting, receiving the SIP URI, and joining the user to the online meeting based on the meeting identifier included in the SIP URI, wherein joining the user results in connecting the telephone call to an audio portion of the online meeting served by the meeting service.

14. The computer readable storage media of claim 13, wherein receiving the telephone call includes receiving the telephone call at an auto-join service configured to provide a hands-free meeting join function, wherein the auto-join service is in communication with the meeting service that serves the online meetings.

15. The computer readable storage media of claim 14, further comprising instructions operable for:

sending a SIP INVITE message to the SIP URI, the SIP INVITE message destined to a SIP interface of the meeting service.

16. The method of claim 1, wherein sending the request for the SIP URI includes sending, by the auto-join service, a Hypertext Transfer Protocol (HTTP) request including the meeting identifier and the user identifier.

17. The method of claim 16, wherein receiving the SIP URI includes receiving a JavaScript Objection Notation Object that provides the SIP URI.

18. The apparatus of claim 9, wherein the processor is configured to send the request for the SIP URI by sending a Hypertext Transfer Protocol (HTTP) request including the meeting identifier and the user identifier.

19. The apparatus of claim 18, wherein the processor is configured to receive the SIP URI by receiving a JavaScript Objection Notation Object that provides the SIP URI.

20. The computer readable storage media of claim 13, wherein receiving the SIP URI includes JavaScript Objection Notation Object that provides the SIP URI.

* * * * *